June 2, 1936. H. S. JANDUS ET AL Re. 19,993

LOCK FOR SPARE WHEELS AND TIRES

Original Filed Sept. 27, 1930 3 Sheets-Sheet 1

Inventors
Herbert S. Jandus
Frederick A. Smith
By Walter W. Miller Attys.

June 2, 1936. H. S. JANDUS ET AL Re. 19,993

LOCK FOR SPARE WHEELS AND TIRES

Original Filed Sept. 27, 1930 3 Sheets-Sheet 2

Inventors
Herbert S. Jandus
Frederick A. Smith
by Carlson & Nielsen Attys.

June 2, 1936. H. S. JANDUS ET AL Re. 19,993

LOCK FOR SPARE WHEELS AND TIRES

Original Filed Sept. 27, 1930 3 Sheets-Sheet 3

Inventors
Herbert S. Jandus
Frederick A. Smith
by Chas. Rosewitch Atty.

Reissued June 2, 1936

Re. 19,993

UNITED STATES PATENT OFFICE 19,993

LOCK FOR SPARE WHEELS AND TIRES

Herbert S. Jandus, Detroit, Mich., and Frederick A. Smith, North Chicago, Ill., assignors to Oakes Products Corporation, North Chicago, Ill., a corporation of Michigan Original No. 1,881,620, dated October 11, 1932, Serial No. 484,764, September 27, 1930. Application for reissue January 18, 1936, Serial No. 59,697

10 Claims. (Cl. 70—90)

This invention has to do with locks, more particularly of the type employed in connection with automobiles, spare wheels, tires and tire covers.

There are numerous locks of this general character now on the market, especially insofar as they relate to the locking of wheels and the tires and/or covers mounted thereon, and these are more or less successful. These locks are attended generally with undesirable features, however, since they are often made with a plurality of separable parts, one or more of which may be easily lost, are quite difficult to assemble and disassemble, and to apply in position, and include complicated mechanism, involving expensive manufacturing operations which render such locks rather high priced.

It is one of the principal objects of this invention to provide a lock of this general character which is of extremely simple construction and involves a minimum of parts which are inseparably connected as a unit, and which may be applied and removed from the tire and wheel very readily, and whose cost of manufacture, by reason of its simplicity, is extremely low.

A further object of the invention resides in the provision of an anti-theft device for locking a spare wheel, the tire mounted thereon, and the tire cover mounted on the tire, to a vehicle, regardless of whether the wheel is mounted in the rear or in the fender well of the car, or elsewhere.

The invention has particular application to that character of wheel which receives one or more male threaded members on a wheel carrier, and to the extremities of which members nuts are applied. In carrying out the invention, we employ a unitary stamping or the like applied on the outside of the spare wheel and in a position to so cover the nut or nuts as to prevent unauthorized access thereto and at the same time partially or completely enclose the valve stem to thereby prevent unauthorized access to the same. A locking element in the form of a lock cylinder or the like is swivelly mounted in the stamping or the like and may be provided with one or more plungers, spring pressed or otherwise, to be received in one or more recesses in the stamping or the like, and removable from such recesses by the proper key inserted in the locked cylinder. The cylinder may be provided with a threaded extension to receive a hook-like member threadedly mounted thereon. The hook of this member is adapted to engage the inner side of the hub or other part of the wheel while the stamping engages the outer side, so that by rotating the cylinder lock to draw the hook member toward the stamping, a vice like arrangement is provided whereby the whole lock is securely mounted on the wheel so that unauthorized access to the carrier nuts and tire valve stem is prevented. Where it is desired to lock only the wheel and the tire, means may be provided for preventing separation of the hook member from the threaded extension of the lock cylinder. However, whenever it is desired to employ a tire cover lock in connection with the other locking instrumentalities, the hook member may include an arm which may take the general form of a question mark, the upper end having a releasable inter-locking engagement with the tire cover, which cover is contemplated as being of the metallic type.

Other and further important objects of this invention will become apparent from the following description and appended claims.

Figure 1:
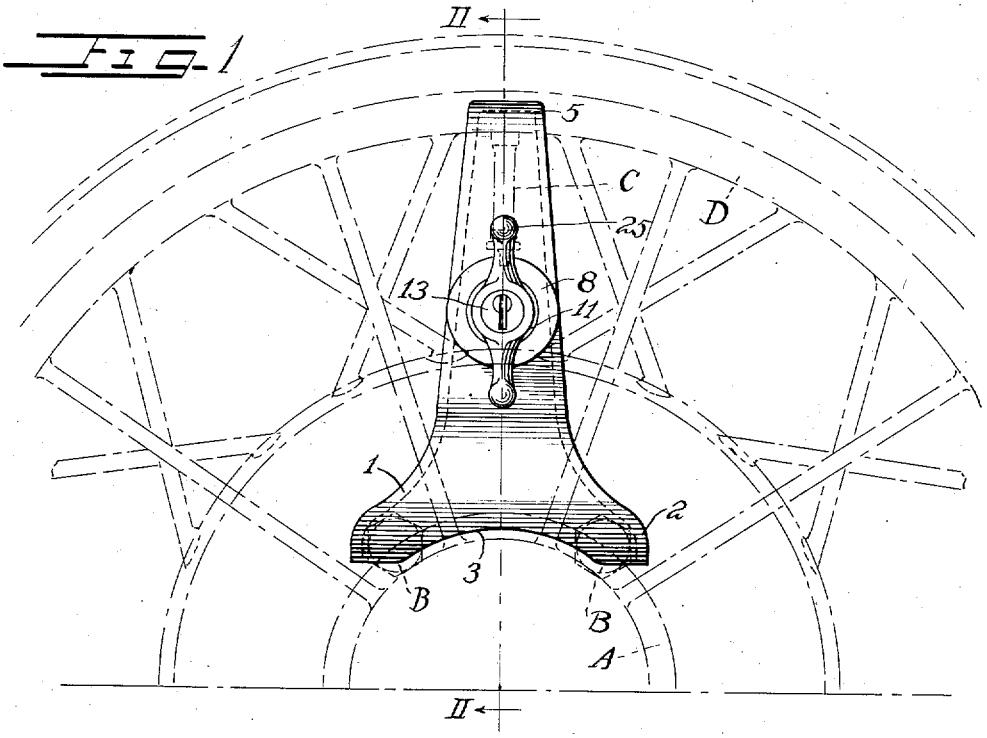
Figure 1 is an elevational view showing one form of our invention used in connection with a wheel and tire of well known construction, the wheel and valve stem of the tire being shown in dotted lines.

Referring now more particularly to the drawings wherein the same parts are indicated by identical characters, we provide a substantially inverted T-shaped housing, which may be stamped or otherwise formed, and having a channel-shaped cross section. The head 2 of the T-shaped member 1, has an end surface 3 conforming in shape substantially to that of the hub indicated at A, which may be of any construction. It will be apparent from the various figures, that the nuts B of the spare wheel carrier F are quite completely enclosed by the walls of the head 2 and the hub A. Rearwardly extending flanges 4 straddle the valve stem C and extend therebeyond sufficiently to cooperate with the rear or other permanent part of the vehicle to prevent access to the valve stem. The upper extremity 5 of the stamping 1 projects somewhat rearwardly from the face of the stamping to abut the wheel rim D at 6, and the casing 1 is provided with short flanges 7 which are so dimensioned that they engage the hub A at substantially the same time that the hub is engaged by the rearwardly extending flanges of the head 2 and the portion 5 engages the rim D.

Figure 2:
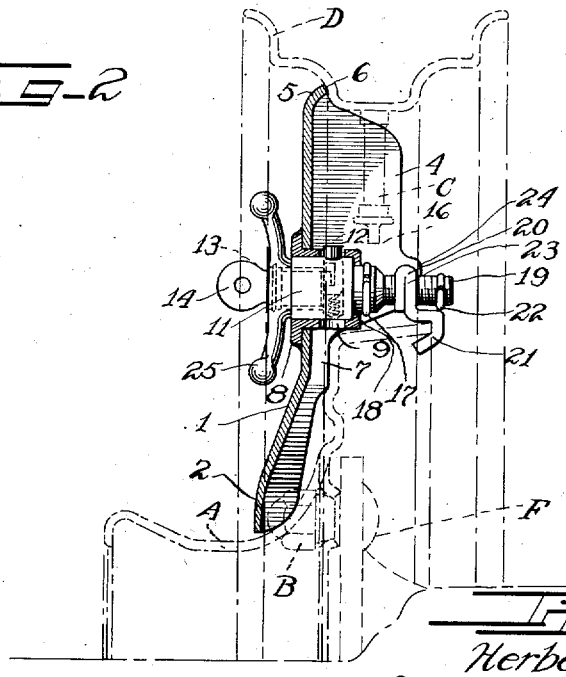
Figure 2 is a longitudinal sectional view taken approximately in the plane indicated by the line II—II in Figure 1, certain parts being shown in elevation.

Integral with or permanently fastened to the casing 1 in any suitable manner is a substantially cylindrical member 8 having one or more substantially radial recesses 9 and a rear, inwardly extending flange 10. A lock cylinder 11 is rotatably mounted in the cylinder 8 and is provided with a spring pressed plunger 12 adapted to normally occupy one of the recesses 9. The lock cylinder 11 contains tumbler means 13 operable by a key 14 and having an eccentric boss 15 operating in the slot 16 of the plunger 12, and adapted when the tumbler means 13 is rotated to unlocked position, to withdraw the plunger 12 from its recess 9 and maintain the same withdrawn against the pressure of the spring. The cylinder 8 is provided with a flange 17 which may be in the form of a split ring fitting in a groove as shown or in any other suitable form, such flange being located on the reduced portion 18 to form with the main body of the cylinder 11 a groove in which the flange 10 is received. Thus the cylinder 11 is swivelled in and incapable of longitudinal movement with respect to the cylinder 8. The cylinder 11 is further reduced and provided with a threaded extension 19, on which a female threaded member 20, having a depending hooked portion 21, is received, the outermost portion of the extension 19 being provided with a flange 22 which may be in the form of a split ring fitting into a groove as shown, or may be permanently secured to the extension 19, to prevent removal of the female member 20 from said extension. The hook portion 21 is adapted to receive a rearwardly extending portion or rim of the hub A as shown, and when the parts are in locked position as seen in Figure 2, it will be evident that the engagement of the hook with said rim is such as to prevent unauthorized rotation of the female member 20 and the male member 19. As a further precaution against such rotation of the female member 20, one or more of the sides 23 of said member are made flat and said flat sides are closely straddled by the flanges 4 of the casing 1.

It will be apparent that when inserting the device into operative position it is necessary merely to apply the same to the wheel from left to right looking at Figure 2. It will be noted that the rearward extremities 24 of the flanges 4 are spaced from the flange 22 a distance in excess of the thickness of the threaded portion of the female member 23, so that when the female member 23 is located in its substantially rear position, it may be rotated about the extension 19. Thus it will be apparent that when the locking instrumentalities are moved into position as just mentioned, the hook 21 may be turned to a position at substantially right angles or at 180° from its position as shown in Figure 2, so that it will offer no obstruction to the proper placement of the various parts in their operative position. When the casing is in engagement with the hub A and the rim D of the wheel as shown, the hook 21 may be engaged by the finger of the person applying the lock and flipped or otherwise moved around until it is in a position to receive the rim of the hub A.

Figure 3:
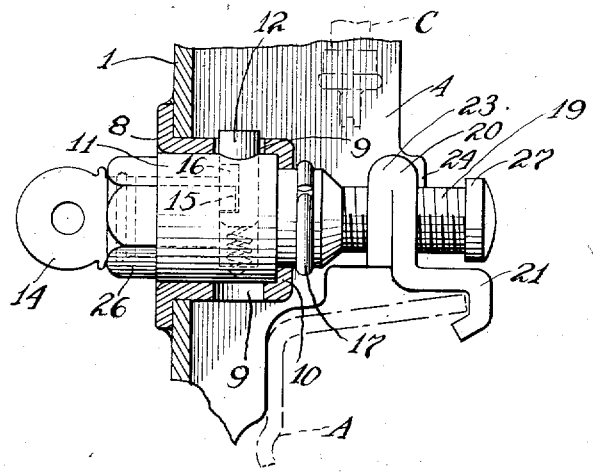
Figure 3 is an enlarged sectional view similar to Figure 2, showing a slightly modified form of the invention.

The cylinder 11 may be provided with handle means indicated at 25 or with wrench engaging means indicated at 26 in the form shown in Figure 3. With the plunger 12 withdrawn into the cylinder 11, the latter is subjected to a rotary motion, either by hand or by means of a wrench, in a direction to draw the hook member 21 forwardly until the same receives the rim of the hub A as shown in Figure 2. The holes 9 are provided for adjustment as well as for locking purposes, and after the parts are properly tightened, the plungers 12 may be moved by means of the key 14 and the spring into the appropriate recess or hole 9. With the key 14 removed it is apparent that the device will effectively prevent unauthorized access to the carrier nuts B and valve stem C to thereby prevent theft of the wheel and tire.

In the form of my invention shown in Figure 3, the only changes over the construction illustrated in Figure 2 resides in the substitution of wrench engaging means 26 for the hand grip means 25 and the permanent flange 27 for the split ring 22.

Figure 4:
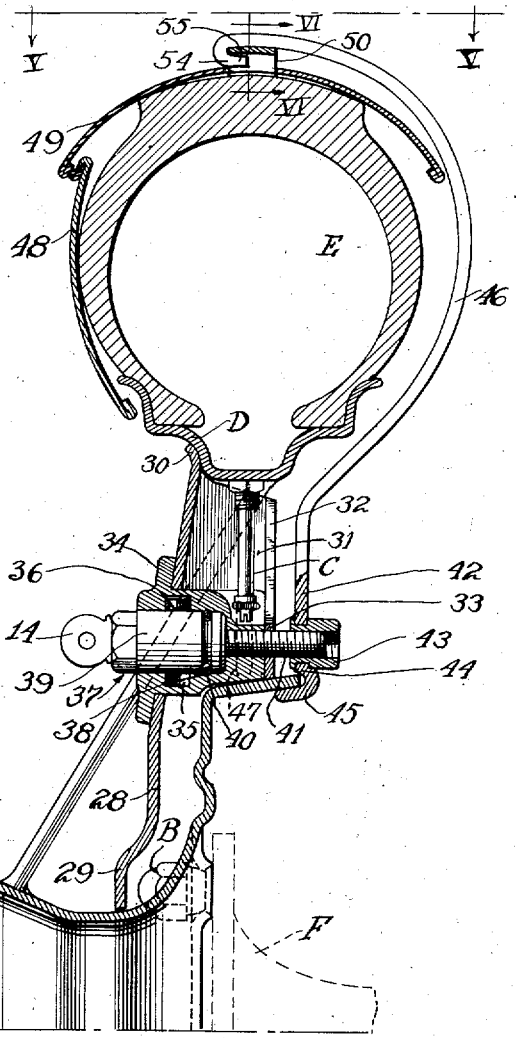
Figure 4 illustrates a form of the invention which includes means for locking a tire cover as well as the wheel and tire.
Figure 5:
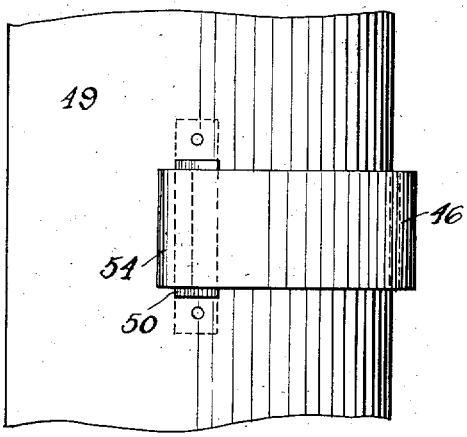
Figure 5 is a fragmentary plan view taken approximately in the plane indicated by the line V—V in the Figure 4.
Figure 6:
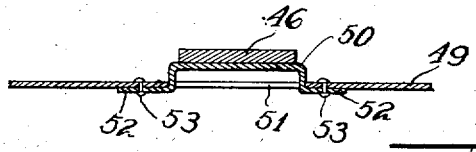
Figure 6 is a sectional view taken approximately in the plane indicated by the line VI—VI in Figure 4.

In the form of our invention shown in Figures 4, 5 and 6, the casing 28 is of the general form illustrated in the previous figures, including a head 29 cooperating with the hub A of the wheel to enclose the carrier nuts B against unauthorized access, and having a lip at its upper extremity in engagement with the wheel rim D. This casing may be in the form of a stamping or otherwise, and its rearwardly extending flanges 31 are rebent or turned in at 32, providing a space through which the valve stem C may easily pass. The base portions 33 of the inwardly extending flanges 32 may be either separated or united or only one such base portion 33 may be provided.

A housing or the like 34 is fitted into the interior of the casing 28 and is provided with one or more substantially radial recesses 35 adapted to receive the spring pressed plunger 36 of the locking instrumentalities 37. These instrumentalities include tumbler means and the like as described in connection with the construction of the Figures 1, 2 and 3, and include a cylinder 39 which is swiveled to the housing 34 in any suitable manner, one manner or form being illustrated as comprising split ring means 40 in complementary grooves 38. The cylinder 39 is provided with a reduced threaded extension 41 unthreaded to the housing 35 and the base portions 33 and projecting therebeyond for engagement with a female member 42. The female member 42 may itself be threaded, or, as shown, a nut 43 is permanently fastened thereto either by welding as at 44 or in any other suitable manner. The female member 42 is provided with a depending hook 45 adapted to receive the rim of the hub A in the manner shown. The member 42 is in the form substantially of a question mark having a body 46 which is curved to conform roughly to the cross-sectional shape of the tire E and the cover mounted thereon. While the housing 34 may be permanently secured to the casing 28 in any well known manner, we have illustrated the same as being secured to the casing by means of one or more depressions 47 in the casing, which depressions fit into corresponding depressions in the housing 34.

While the body 46 of the member 42 may be suitably formed for interlocking engagement with any type of tire cover, we illustrate the same in connection with a metallic cover embodying a side annular plate 48 adapted for engagement with the outer wall of a tire E and held securely against the wall of the tire by means of a split spring ring member 49 which, by reason of its resilience, maintains the side plate 48 as well as itself tightly and securely on the tire. The ring member 49 is provided with a staple 50 which may be integrally or permanently secured thereto in any suitable manner. As illustrated, the member 49 is provided with an opening 51 through which the body of the staple 50 projects as clearly shown in Figure 6, such staple being provided with flanges 52 riveted at 53 to the ring 49. The body of the staple 50 is spaced from the ring 49 and the body 46 of the member 42 is provided with a hook 54 adapted to receive the forward edge of the staple 50, the spacing of the body of the staple from the ring 49 being such as to permit a slight amount of play between it and the inturned end 55 of the hook 54.

In applying the lock to the wheel, tire and cover, the member 42 is separated from the remainder of the locking instrumentalities and is inserted between the body of the car and the spare wheel until the hook portion 54 is positioned adjacent the staple 50, whereupon the hook portion 54 is moved into interlocking engagement with the staple 50. The hook portion 45 of the member 42 is then hooked over the rearwardly extending rim of the hub A. The casing 28 with its various locking instrumentalities is moved from left to right looking at Figure 4 in such a manner as to receive the valve stem 6 and to cover the nuts B, whereupon the threaded extension 41 will be disposed in a position to enter the threaded portion 43 of the member 42. The parts are held together by the hand or otherwise, the key 14 is operated to withdraw the plunger 36 if the the latter is not alalready withdrawn, and the cylinder 39 is subjected to a rotary motion until the threaded extension 41 has gained an entrance to the nut portion 44. The hand may then be withdrawn, and the cylinder 39 further rotated until the casing 28 and the member 42 constitute in effect the jaws of a vice-like structure engaging opposite sides of the hub A. When the plunger 36 is opposite a recess 35 which will provide the proper adjustment, the key 14 is inserted and rotated until the plunger enters such recess, thereby effectively locking the spare wheel, tire and cover against theft.

While the staple 50 is illustrated as being of a substantially flat construction, it will be appreciated that the same may be cylindrical or otherwise formed, and the hook 54 similarly shaped to provide sufficient pivotal movement therebetween to obviate any obstruction to the separation and drawing together of the threaded parts 41 and 43.

Figure 7:
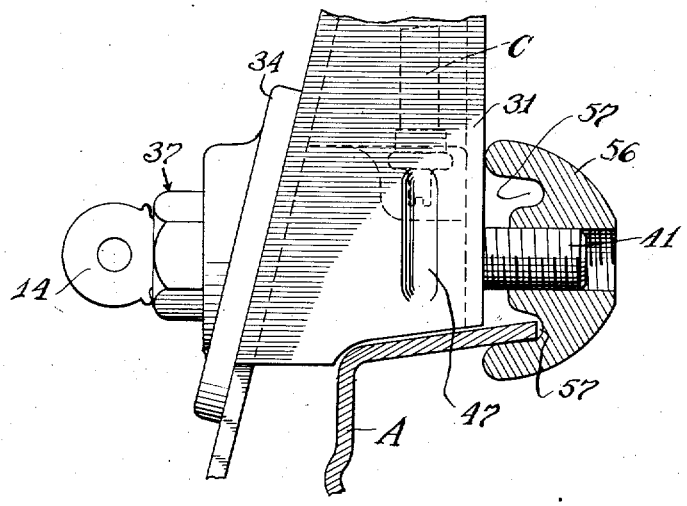
Figure 7 is a fragmentary view partially in section showing another form of the invention.

The construction in Figure 7 shows the same form of invention as is illustrated in Figure 4, except that the tire cover locking member is replaced by a simple nut 56 similar to a wing nut and having a pair of grooves 57, a plurality of such grooves being provided to facilitate application of the nut to the rim of the hub A.

We are aware that numerous details of construction may be varied through a wide range without departing from the principles of this invention, and we, therefore, do not purpose limiting the patent granted, otherwise than necessitated by the prior art.

We claim as our invention:

1. In a device for rendering theftproof a spare wheel and tire mounted on a carrier, a pair of jaws engageable with opposite sides of the wheel for gripping the latter, one of said jaws comprising a housing for receiving the wheel mounting means and the tire valve, whereby to prevent access to said means and valve, instrumentalities for adjusting said jaws relative to each other, and means for limiting separative movement of said jaws, whereby a unitary device is provided.

2. In a device for rendering theftproof a spare wheel and tire mounted on a carrier, a pair of jaws engageable with opposite sides of the wheel for gripping the latter, one of said jaws comprising a housing for receiving the wheel mounting means and the tire valve, whereby to prevent access to said means and valve, and instrumentalities for adjusting said jaws relative to each other, said instrumentalities being swivelly connected to one of said jaws.

3. In a device for rendering theftproof a spare wheel and tire mounted on a carrier, a pair of jaws engageable with opposite sides of the wheel for gripping the latter, one of said jaws comprising a housing for receiving the wheel mounting means and the tire valve, whereby to prevent access to said means and valve, and instrumentalities for adjusting said jaws relative to each other, said instrumentalities being in threaded engagement with one of said jaws and swivelled to the other of said jaws.

4. In a device for rendering theftproof a spare wheel and tire mounted on a carrier, a pair of jaws engageable with opposite sides of the wheel for gripping the latter, one of said jaws comprising a housing for receiving the wheel mounting means and the tire valve, whereby to prevent access to said means and valve, and instrumentalities for adjusting said jaws relative to each other, said jaws having cooperating flat portions to inhibit relative rotation of said jaws.

5. In a device for rendering theftproof a spare wheel and tire mounted on a carrier, a pair of jaws engageable with opposite sides of the wheel for gripping the latter, one of said jaws comprising a housing for receiving the wheel mounting means and the tire valve, whereby to prevent access to said means and valve, and instrumentalities for adjusting said jaws relative to each other, one of said jaws comprising a hooked portion engageable within the rim of the wheel hub.

6. In a device of the class described, a spare wheel, tire and cover, relatively movable clamp members, instrumentalities for clamping said members against opposite sides of the wheel, one member having means to prevent removal of the wheel from a carrier and the other member having means for interlocking engagement with the cover.

7. In a device of the class described, a spare wheel, tire and tire cover, a carrier having means for mounting the wheel thereon, a plurality of relatively adjustable members engageable with opposite sides of the wheel, one of said members having means to prevent effective access to the mounting means, the second member and cover being detachably interlocked, and means for locking all of the parts against unauthorized disturbance.

8. In a device of the class described, a spare wheel, tire and cover, relatively movable clamp members, instrumentalities for clamping said members against opposite sides of the wheel, one member having means to prevent removal of the wheel from a carrier and the other member having means for interlocking engagement with the cover, said first-mentioned member and its clamping means including a part connected to said carrier and a bolt for securing the wheel thereto, and said other member and its clamping means including a part connected to the tire cover and having lock means for preventing unauthorized removal of the cover from the tire and wheel.

9. In a device of the class described, a spare wheel, tire and cover, relatively movable clamp members, instrumentalities for clamping said members against opposite sides of the wheel, one member having means to prevent removal of the wheel from a carrier and the other member having means for interlocking engagement with the cover, said first-mentioned member and its clamping means including a part connected to said carrier and a bolt for securing the wheel thereto, and said other member and its clamping means including a part connected to the tire cover and having lock means for preventing unauthorized removal of the cover from the tire and wheel, said lock means including a key-operable plunger accessible from the outer side of the wheel.

10. In a device of the class described, a spare wheel, tire and cover, relatively movable clamp members, instrumentalities for clamping said members against opposite sides of the wheel, one member having means to prevent removal of the wheel from a carrier and the other member having means for interlocking engagement with the cover, said first-mentioned member and its clamping means including a part connected to said carrier and a bolt for securing the wheel thereto, and said other member and its clamping means including a part connected to the tire cover and having lock means for preventing unauthorized removal of the cover from the tire and wheel, said lock means including a key-operable plunger accessible from the outer side of the wheel and extending inwardly of the tire and wheel for locking the cover, wheel and tire against unauthorized removal from the carrier.

HERBERT S. JANDUS.
FREDERICK A. SMITH.